Aug. 25, 1936.   R. S. SANFORD   2,051,906
CLUTCH AND BRAKE OPERATOR
Filed Jan. 8, 1934   3 Sheets-Sheet 1
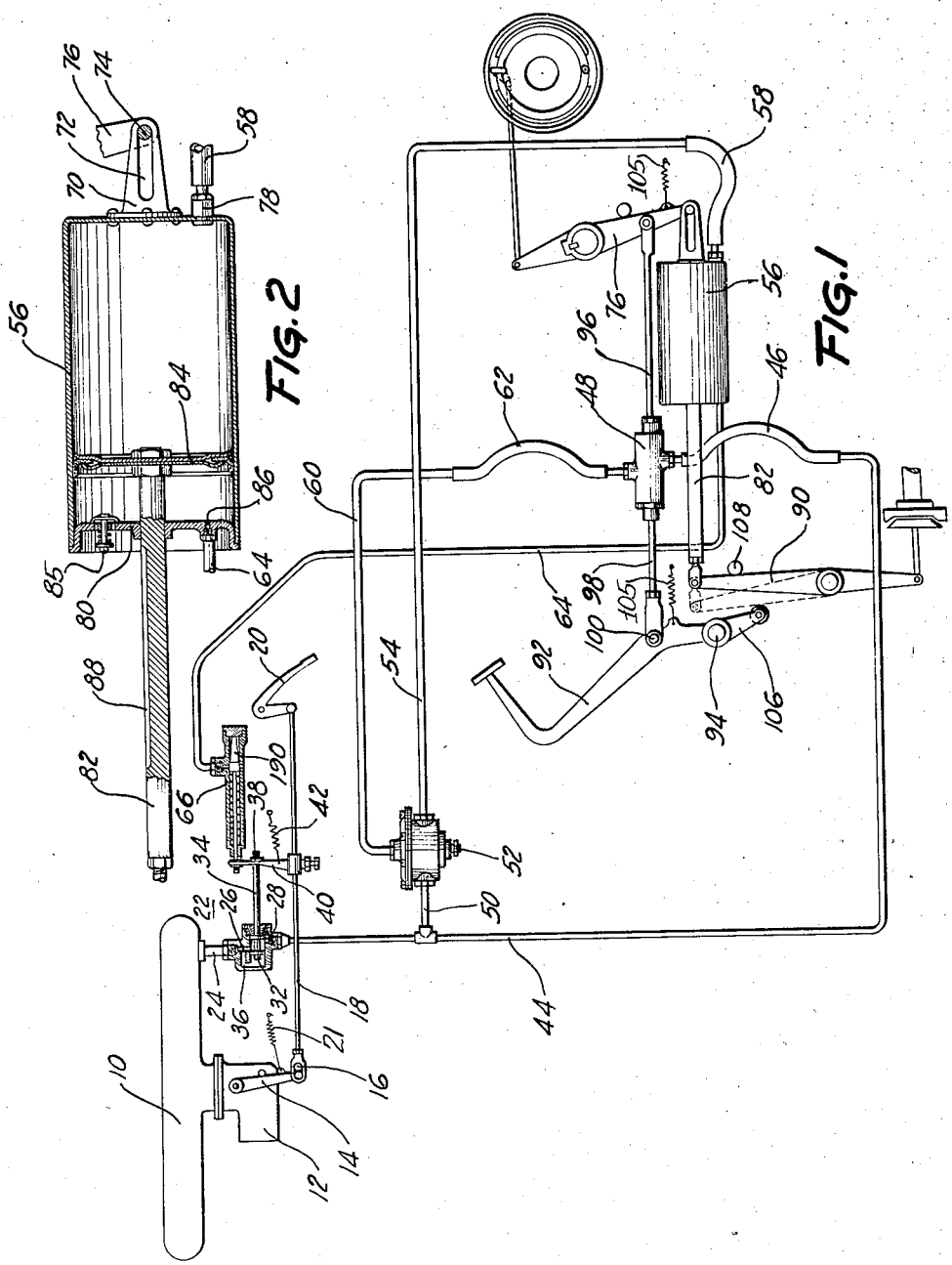
INVENTOR.
ROY S. SANFORD
BY H. O. Clayton
ATTORNEY Aug. 25, 1936.　　　R. S. SANFORD　　　2,051,906
CLUTCH AND BRAKE OPERATOR
Filed Jan. 8, 1934　　　3 Sheets-Sheet 2
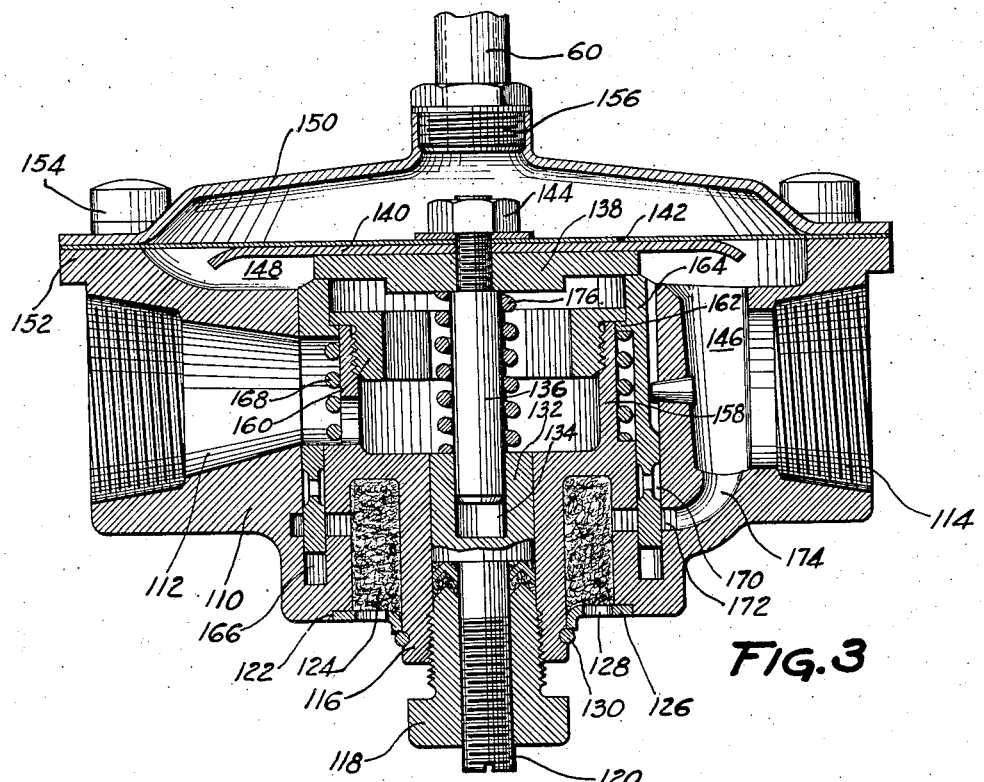
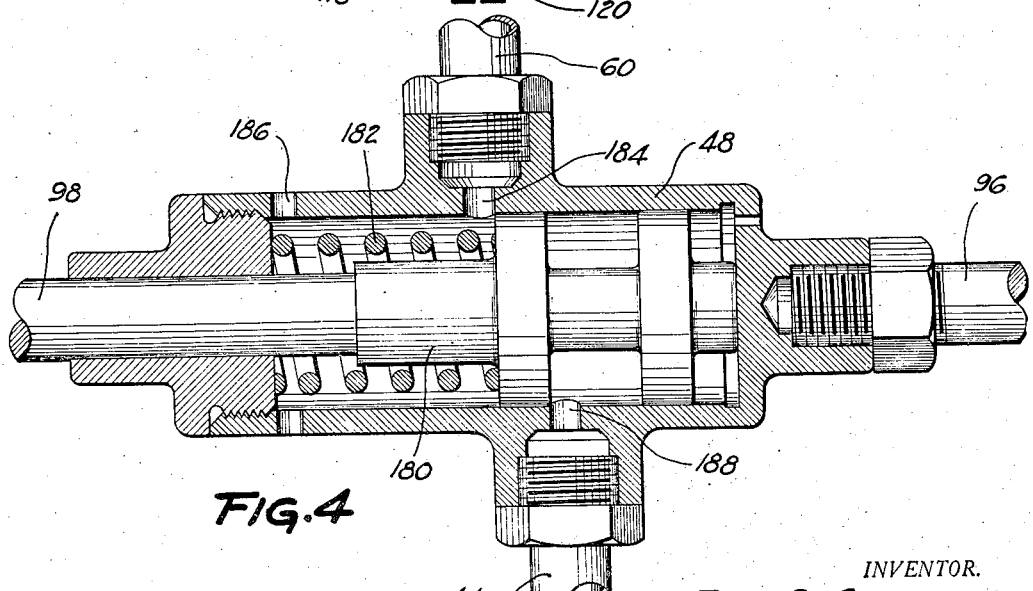
INVENTOR.
ROY S. SANFORD
BY
ATTORNEY Aug. 25, 1936.  R. S. SANFORD  2,051,906
CLUTCH AND BRAKE OPERATOR
Filed Jan. 8, 1934    3 Sheets-Sheet 3

INVENTOR.
ROY S. SANFORD
BY
ATTORNEY

Patented Aug. 25, 1936

2,051,906

UNITED STATES PATENT OFFICE 2,051,906

CLUTCH AND BRAKE OPERATOR

Roy S. Sanford, New York, N. Y., assignor to Bendix Aviation Corporation, South Bend, Ind., a corporation of Delaware Application January 8, 1934, Serial No. 705,771

10 Claims. (Cl. 192—.01)

My invention relates to automotive vehicle control mechanism and has particular reference to brake and clutch actuating mechanism.

An object of the invention is to simplify the power operation of these two control units and to secure constantly reliable operation thereof, requiring a minimum of effort.

More specifically, one object of the invention is to utilize a single power actuated member to operate both the brake and the clutch and to so arrange the various parts and control members associated with the power actuating means that the clutch is automatically disengaged upon release of the fuel control throttle, and the power source which accomplishes this function becomes available thereafter upon manual manipulation of a brake control member to actuate the brakes.

This invention has particular reference to the use of vacuum power for accomplishing the above specified objects, and an important feature of the invention resides in the particular arrangement and construction of valve control means, which renders a portion of the total vacuum available from the engine of the vehicle operable upon release of the throttle to disengage the clutch and whereby the remainder of the vacuum available from said source is rendered operable subsequently thereto on manipulation of the brake control member to apply the brakes.

A further object of the invention is to provide power means for disengaging the clutch and applying the brakes of an automotive vehicle, said means being controlled by valvular means operative to first partially energize the power means to disengage the clutch and then to progressively energize the power means to apply the brakes.

Yet another object of the invention is to provide power means for operating the clutch and brakes, said means being controlled by valvular means including two manually controlled valves and an automatically operated governor valve, the latter functioning as a pressure limiting valve to control the power means to operate the clutch and functioning as a power operated relay valve to control the power means to operate the brakes.

A further important feature of the invention resides in the particular arrangement whereby a single manual control member may be actuated to first disengage the clutch and subsequently apply the brakes without the aid of power effort in the event that the power mechanism should become useless for some reason or another.

Other meritorious features of the invention reside in the combination and arrangement of parts whereby the above objects are secured, which structure has been illustrated in the accompanying drawings, wherein like numerals refer to like parts throughout the several figures and wherein:

Figure 1 is a diagrammatic illustration of the entire control system;

Figure 2 is a longitudinal section through the vacuum booster cylinder;

Figure 3 is a section through the governor valve;

Figure 4 is a section through the brake control valve;

Figure 5:
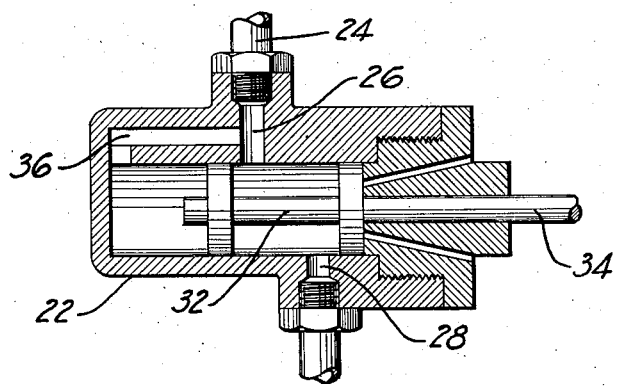
Figure 5 is an enlarged sectional view of the primary control valve.
Figure 6:
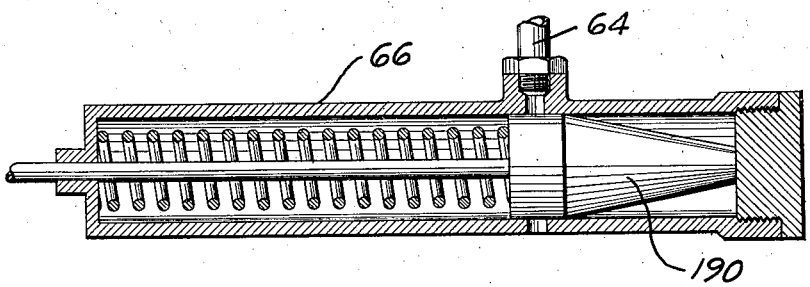
Figure 6 is an enlarged sectional view of the bleed valve.

Referring now to Figure 1, the vacuum source has been illustrated diagrammatically by a conventional intake manifold 10 associated in the usual way with the motor of a vehicle and having associated therewith a carburetor 12 operable by the swinging movement of a valve arm 14, which is actuated through an overrunning pin and slot connection 16 with an accelerator rod 18, to which latter is pivotally connected the accelerator pedal 20. The arm 14 is returned to its off position by a spring 21.

What may be regarded as a primary control valve 22 is connected by vacuum conduit 24 to a tap in the intake manifold. This valve includes ports 26 and 28, communication between these ports being opened and closed by a spool valve 32 which includes a valve actuating stem 34 extending rearwardly out of the valve casing. The valve is provided with a by-pass 36 communicating with port 26 and extending to the front end of the valve cylinder. In the position illustrated, ports 26 and 28 are in communication with one another.

The rear extremity of the valve actuating stem 34 is provided with a head 38 which abuts the bracket 40, the said bracket including an enlarged aperture through which the actuating stem 34 extends. The bracket 40 is fixedly secured to the accelerator rod 18, and the rod and bracket are yieldably held at their rearward limit of movement by means of a spring 42. When the accelerator pedal 20 is depressed the bracket 40 is moved forward with the accelerator rod away from the head 38 on the valve stem 34, and vacuum in the forward part of the cylinder of valve 22 will function to draw the spool valve forwardly, thus cutting off communication between ports 26 and 28.

A vacuum conduit 44 extends from port 28 of the primary valve and communicates through a flexible connection 46 with brake control valve 48. The conduit 44 has a branch 50 which communicates with a governor valve 52, a conduit 54 extending from the other side of the governor valve to the rear end of the vacuum booster cylinder 56, to which it is connected by flexible conduit 58. A third port in the governor valve 52 communicates through the conduit 60 and a flexible connection 62 with a second port in the brake control valve 48. A bleed line 64 extends from the forward end of the booster cylinder to a bleed valve 66 which will be described more in detail hereinafter.

The booster cylinder has been illustrated more in detail in Figure 2 and comprises a cylinder 56, the rear closed end of which has secured thereto a bracket 70 provided with an elongated slot 72 in which a pin 74 positioned in brake actuating arm 76 is adapted to slide. Flexible conduit 58 is secured to a fitting 78 which provides access to the interior of the cylinder. The forward end of the cylinder is provided with a closure member 80 having an aperture in the center thereof through which the stem 82 of a booster piston 84 is adapted to slide. A one-way valve 85 permits the entrance of air into the forward end of the cylinder as that portion of the cylinder on the other side of the piston 84 is being exhausted. The opening 86 communicates with line 64 leading to the bleed valve 66.

The stem 82 of the booster piston is provided with a slot 88 intermediate its ends for a purpose which will be more clearly brought out hereinafter.

The booster cylinder 56 is floatingly supported between the brake actuating arm 76 and the clutch actuating arm 90, to which the forward extremity of the booster piston stem 82 is pivotally secured. A brake pedal 92 is pivotally supported as at 94, and the brake control valve 48 is floatingly supported between the brake arm 76 and the brake pedal by rod 96, which is fixedly secured to the valve casing at one extremity and pivotally secured to the brake arm 76 at its other extremity, and rod 98, which is connected with or integral with the valve operating within the valve casing at one extremity and pivotally secured as at 100 to the brake pedal at the other extremity. It will be apparent that the flexible connections 46, 62, and 58, communicating respectively with the brake control valve 48 and the booster cylinder 56, interfere in no way with the floating position of these two members. The brake pedal 92 and brake applying arm 76 are biased to their brake released positions by spring 105.

The brake pedal 92 is provided with a depending arm 106 having a roller positioned at its extremity adapted to engage the clutch arm 90 in the event of failure of the power mechanism.

The illustration of Figure 1 represents the position of the various elements when the accelerator pedal 20 is released, thereby providing communication through governor valve 52 and line 54 to the rear end of the booster cylinder 56. A very important feature of this invention resides in the fact that the yieldable means normally retaining the brakes in released position is stronger than the yieldable means normally tending to maintain the clutch in engaged position. By reason of this fact the vacuum transmitted to the rear end of the booster cylinder 56 when the accelerator pedal is released will first draw the piston 84 through the cylinder to bring the clutch arm 90 up against the stop pin 108, at which point the clutch is fully released.

Another important feature of the invention resides in the particular structure of the governor valve 52 whereby it may be adjusted to provide a pressure limiting valve, and is so adjusted prior to installation, in such a way that a predetermined vacuum power only is transferred therethrough and through conduit 54 to the rear end of the booster cylinder when the accelerator pedal is released to open the primary control valve 22. This valve comprises a casing 110 having an intake port 112 on one side and an exhaust port 114 on the other. The casing includes a sleeve portion 116 closed at its outer extremity by means of a threaded cap nut 118 having a threaded bore extending therethrough in which is positioned an adjusting nut 120. An annular groove 122 extends around the said sleeve and is preferably filled with some type of air filter or cleaner 124, which is retained in place by means of an annular collar 126 provided with apertures as at 128 and held in place by snap ring 130.

The adjusting nut 120 is provided at its inner extremity with a head 132 having a central seat 134 therein which is adapted to limit the downward movement of stem 136. A valve head 138 is positioned at the upper extremity of stem 136, the said head having a plate 140 positioned thereover and a pressure sensitive diaphragm 142 superimposed thereover, the three units being secured together by means of a nut 144 threaded over the threaded upper extremity of stem 136.

The valve casing 110 is provided with a passage 146 constituting a channel in the valve body on one side which merges into a disc shaped depression 148 on the intake side of the valve. A cover plate 150 is secured to the upper shoulder 152 of the casing 110 by means of spaced bolts 154, which bolts likewise function to secure the outer peripheral edge of the diaphragm 142 firmly in position. This cover is provided with a port 156, which is in communication with the vacuum conduit 60 leading to the brake control valve 48.

The valve casing 110 is likewise provided with an annular flange 158 into the upper extremity of which is threaded a stop member 160 adapted to engage an inwardly extending flange 162 extending around the inside of the sleeve valve 164. This sleeve valve is slidable in an annular groove 166 provided in the valve casing and it is adapted to be moved downwardly with the valve head 138 against the resistance of a coil spring 168. The said sleeve valve 164 is provided with a restricted portion 170 extending circumferentially therearound, which restricted portion is adapted to register with an annular port 172 which communicates with the exhaust port 114 through a passage 174. The annular port is likewise in communication with the air chamber 124, and it is through this port that the booster cylinder is vented to air.

A coil spring 176 tends to urge the diaphragm 142 upwardly. The position of the valve parts as illustrated in Figure 3 represents the position attained when the booster cylinder has been sufficiently evacuated to actuate the piston stem 82 to release the clutch. The strength of spring 176 is such that it normally maintains the valve head 138 and the diaphragm 142, secured thereto, removed from the seat provided by the upper edge of the sleeve valve 164. Under such circumstances, when the accelerator is released and the primary control valve 22 is opened to provide vacuum communication with the intake port 112 of the governor valve, the booster cylinder is just sufficiently evacuated to overcome the resistance of the clutch arm 90. The upper side of the diaphragm 142 is vented to air through brake control valve 48, as will be brought out hereinafter, when the brake pedal 92 is not depressed. When this predetermined degree of vacuum exists below the diaphragm 142, the pressure of spring 176 is overcome by the atmospheric pressure above the diaphragm to seat the valve head 138 and cut off further communication of the booster cylinder with the vacuum.

At this stage the clutch is released and the clutch arm 90 abuts the stop pin 108. When the brake pedal is then depressed, the spool valve 180 in brake control valve 48 will be drawn forwardly against the resistance of spring 182 to cut off the port 184 from the forward part of the valve 48, which portion of said valve is vented to air as at 186. Immediately thereafter communication between vacuum port 188 of valve 48, which is connected to vacuum line 44, and port 184 is established. The result is that the air on the opposite side of the diaphragm 142 is withdrawn. This permits the coil spring 176 to raise the valve head and diaphragm to again provide communication through the governor valve 52 to the brake booster cylinder 56. With this increase in vacuum, and with the piston stem 82 held against further movement by the stop pin 108, the booster cylinder will be moved forwardly, drawing with it the brake arm 76 to apply the brakes. Should the brake pedal be momentarily held stationary as the brakes are being applied, the casing 48 will move forwardly to cover the port 184 by the head of the valve member 180, thus serving to cut off the source of vacuum and effect a seating of the valve 138. The brakes are thus held applied by this so-called follow up action of the valve mechanism.

During the above operation a greater vacuum will be established on the under side of the diaphragm 142 than existed theretofore and therefore, when the brake pedal 92 is released to once again vent the upper side of diaphragm 142 to the atmosphere, the difference in pressure will be sufficient to overcome resistance of both spring 176 and spring 168. The result is that the downward movement of the valve head 138 forces the sleeve valve 164 with it to bring the restricted portion 170 thereof into registry with the port 172. In this way the rear end of the booster cylinder is vented to air and the brakes are released. Obviously, the brakes may be progressively released by successive increments of movement of the brake pedal to thus alternately register the restricted portion 170 and the full-bodied portion therebelow with the port 172.

Depression of accelerator pedal 20 will close the primary valve 22, and the escape of air from the forward end of booster cylinder 56 through line 64 will be controlled by the tapered valve 190 of bleed valve 66. A further cushioning of the release movement of the booster assembly is secured by means of slot 88, whereby the passage provided thereby for the escape of air on forward movement of the piston in the cylinder is closed just prior to completion of such movement, thereby trapping the air ahead of the piston 84 to a certain extent and cushioning the last stage of release movement. This insures easy, uniform engagement of the clutch.

In the event of failure of the power mechanism depression of brake pedal 92 will first actuate the clutch arm 90 by engagement therewith of the roller on arm 106, the spring 182 being compressed during this movement, after which the brake arm 76 is actuated through the mechanical linkage including the brake control valve 48.

There is thus provided a unitary, compact and effective power means for operating both the clutch and brakes of the vehicle, the clutch being automatically disengaged prior to the application of the brakes merely by releasing the accelerator, and the brakes being progressively applied at the will of the driver by the operation of a manually operated master valve and a relay valve controlled thereby.

I claim:

1. In an automotive vehicle provided with brakes and a clutch, power means for operating said brakes and clutch, and valvular means for controlling the operation of said power means, and operative to first partially energize said power means to disengage the clutch and subsequently operative to progressively energize the power means to apply the brakes, said valvular means including an accelerator operated valve and a power operated relay valve controlled in part by said accelerator operated valve.

2. An automotive vehicle provided with a clutch, brakes, brake pedal and an accelerator, and comprising in combination therewith power means operatively connected to the clutch and brakes, and valvular means for controlling the operation of the power means to control the operation of the clutch and brakes, said valvular means comprising an accelerator operated three-way valve, a brake pedal operated three-way valve and an automatically operated governor valve controlled jointly by the aforementioned valves.

3. In an automotive vehicle provided with brakes and a clutch, a brake pedal and an accelerator, power means for successively operating the clutch and brakes to disengage and apply the same respectively, and valvular means for controlling the operation of said power means comprising a valve operable by the accelerator to initiate the operation of the power means, a valve operable by the brake pedal and an automatically operable valve jointly controlled by the aforementioned valves, said automatically operable valve being constructed to function as a pressure limiting valve to effect a partial operation of the power means to disengage the clutch and to function as a relay valve to effect a further operation of the power means to apply the brakes.

4. In an automotive vehicle provided with a clutch and brakes, a single power actuator energizable to successively disengage the clutch and apply the brakes, and valvular means for controlling the operation of said power means comprising an automatically operable governor valve, a manually operable primary valve operable to initiate the operation of said power means to disengage the clutch through the intermediary of said automatically operable valve, and a second manually operable valve also operative, through the intermediary of said automatically operable valve and after the aforementioned clutch disengaging operation, to energize the power means to apply the brakes.

5. In vehicle control mechanism of the class described, a clutch arm and a brake arm, yieldable means coupled with the clutch arm retaining the same engaged, less easily yieldable means coupled with the brake arm to hold the brakes released, and a power device pivotally connected to said arms and floatingly supported therebetween.

6. In vehicle control mechanism of the class described, a clutch arm and a brake arm, yieldable means coupled with the clutch arm retaining the same engaged, less easily yieldable means coupled with the brake arm to hold the brakes released, and a power device including a pair of independently movable parts floatingly supported between said arms, said parts being coupled respectively with said arms.

7. In an automotive vehicle having a fuel throttle, an intake manifold and a pair of mechanical operating arms offering unequal resistance to movement, the combination of a vacuum booster cylinder coupled with one arm, a piston therein coupled with the other arm, means operable on release of the throttle to connect the cylinder with the intake manifold, and valve means positioned in the vacuum line to the cylinder operable to limit the vacuum transferred through said line to the cylinder.

8. In an automotive vehicle having a fuel throttle, an intake manifold and a pair of mechanical operating arms offering unequal resistance to movement, the combination of a vacuum booster cylinder coupled with one arm, a piston therein coupled with the other arm, means operable on release of the throttle to connect the cylinder with the intake manifold, and valve means positioned in the vacuum line to the cylinder operable automatically to limit the vacuum transferred through said line to an amount sufficient to operate that arm of the aforementioned arms having the least resistance to movement.

9. In an automotive vehicle having a fuel throttle, an intake manifold and a pair of mechanical operating arms offering unequal resistance to movement, the combination of a vacuum booster cylinder coupled with one arm, a piston therein coupled with the other arm, means operable on release of the throttle to connect the cylinder with the intake manifold, valve means in the vacuum line to the cylinder automatically operable to limit the vacuum transferred to said cylinder to a value sufficient to overcome the smaller resistance offered by one of the two arms, and independently controllable valve means coupled with the vacuum source to increase the degree of vacuum transferred to the cylinder to a value sufficient to overcome the greater resistance offered by the other arm.

10. In an automotive vehicle having a fuel throttle, a manifold and a pair of mechanical operating arms offering unequal resistance to movement, the combination of a vacuum booster cylinder coupled with one arm, a piston therein coupled with the other arm, means operable on release of the throttle to connect the cylinder with the manifold, valve means in the vacuum line to the cylinder automatically operable to limit the vacuum transferred to said cylinder to a value sufficient to overcome the smaller resistance offered by one of the two arms, and independently controllable valve means coupled with the vacuum source and operable to again operate said first mentioned valve means to increase the degree of vacuum for energizing the cylinder to a value sufficient to overcome the greater resistance offered by the other arm.

ROY S. SANFORD.